United States Patent
Chao-Cheng

[11] Patent Number: 5,991,643
[45] Date of Patent: Nov. 23, 1999

[54] RADIO TRANSCEIVER HAVING SWITCHABLE ANTENNAS

[75] Inventor: Chen Chao-Cheng, Taipei Hsien, Taiwan

[73] Assignee: Acer Peripherals, Inc., Taoyuan, Taiwan

[21] Appl. No.: 09/005,528

[22] Filed: Jan. 12, 1998

[51] Int. Cl.⁶ .................................................. H04B 7/10
[52] U.S. Cl. ............... 455/562; 455/575; 455/277.1; 455/277.2; 455/101; 343/702; 343/728
[58] Field of Search ............................ 455/562, 550, 455/38.3, 575, 90, 277.1, 277.2, 101; 343/702, 728; 342/419, 423; 333/17.3

[56] References Cited

U.S. PATENT DOCUMENTS

| | | | |
|---|---|---|---|
| 4,633,519 | 12/1986 | Gotoh et al. | 455/277.2 |
| 4,977,616 | 12/1990 | Linder et al. | 455/277.2 |
| 5,119,501 | 6/1992 | Perry et al. | 455/562 |
| 5,369,801 | 11/1994 | Smith | 455/277.1 |
| 5,499,397 | 3/1996 | Wadin et al. | 455/277.1 |
| 5,649,306 | 7/1997 | Vannatta et al. | 455/575 |
| 5,760,747 | 6/1998 | McCoy et al. | 343/728 |
| 5,784,032 | 7/1998 | Johnston et al. | 343/702 |

*Primary Examiner*—Wellington Chin
*Assistant Examiner*—Isaak R. Jama
*Attorney, Agent, or Firm*—Winston Hsu

[57] ABSTRACT

The present invention relates to a radio transceiver having a plurality of switchable antennas. The radio transceiver comprises (1) a housing, (2) a dipole antenna installed on the housing for transmitting and receiving radio signals, (3) at least one patch antenna installed on the housing for transmitting and receiving radio signals, each patch antenna being connected to an antenna switch, (4) an impedance matching circuit connected to the dipole antenna and each said antenna switch, (5) a transceiver circuit connected to the impedance matching circuit for converting radio signals received by the antennas into base band signals and converting base band signals to be transmitted into radio signals, (6) and mode control means for controlling each said antenna switch and the impedance matching circuit to match the impedance of the impedance matching circuit with the connected antennas.

15 Claims, 2 Drawing Sheets

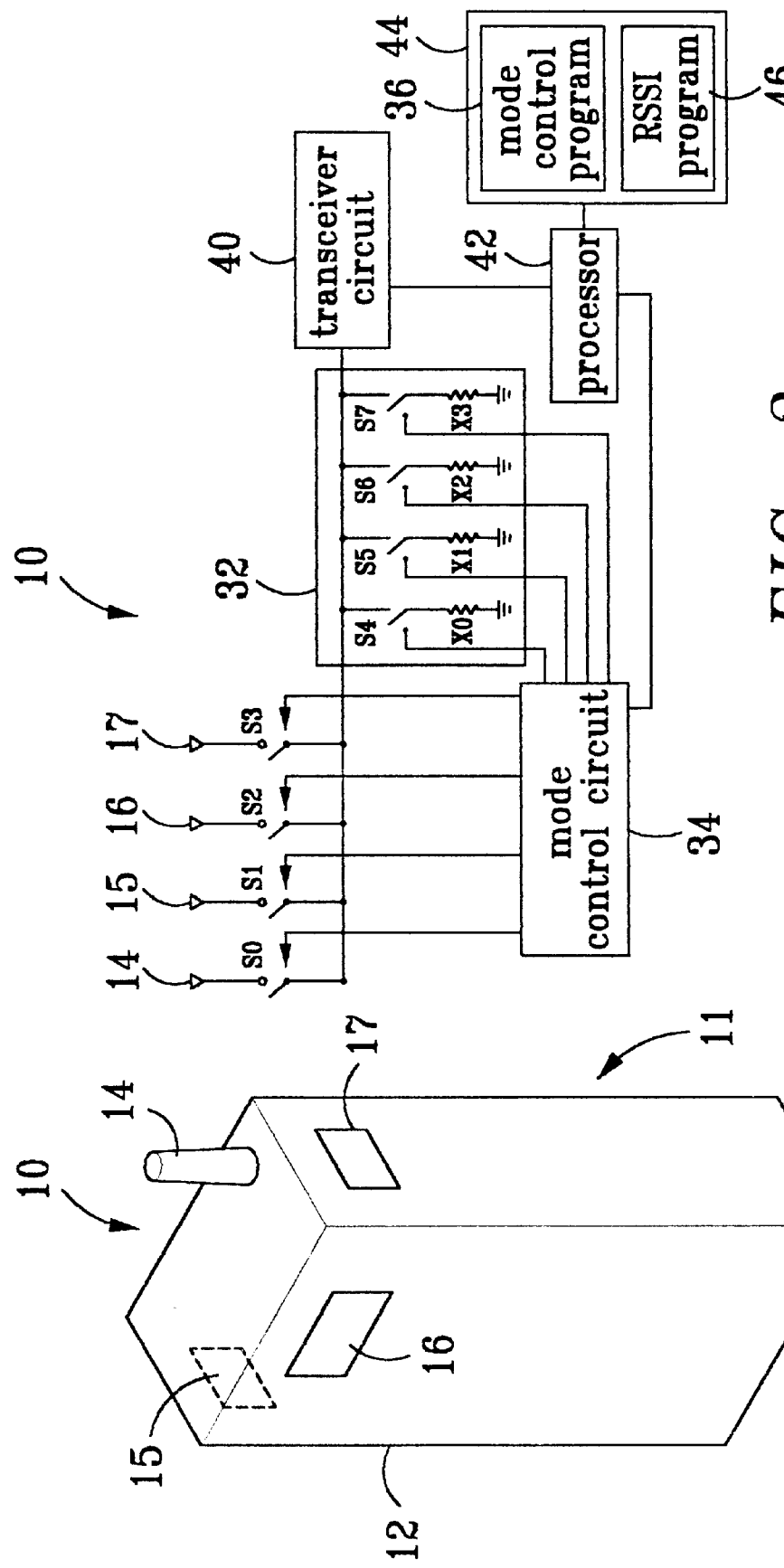

FIG. 3

| | S0 | S1 | S2 | S3 | S4 | S5 | S6 | S7 |
|---|---|---|---|---|---|---|---|---|
| 1 | 1 | 0 | 0 | 0 | 1 | 0 | 0 | 0 |
| 2 | 1 | 1 | 0 | 0 | 1 | 1 | 0 | 0 |
| 3 | 1 | 0 | 1 | 0 | 1 | 0 | 1 | 0 |
| 4 | 1 | 0 | 0 | 1 | 1 | 0 | 0 | 1 |
| 5 | 0 | 1 | 0 | 0 | 0 | 1 | 0 | 0 |
| 6 | 0 | 0 | 1 | 0 | 0 | 0 | 1 | 0 |
| 7 | 0 | 0 | 0 | 1 | 0 | 0 | 0 | 1 |
| 8 | 0 | 1 | 1 | 1 | 0 | 1 | 1 | 0 |
| 9 | 0 | 0 | 1 | 0 | 0 | 0 | 1 | 1 |
| 10 | 0 | 1 | 0 | 1 | 0 | 1 | 0 | 1 |

RADIO TRANSCEIVER HAVING SWITCHABLE ANTENNAS

BACKGROUND OF THE INVENTION

1. Field of the Invention

The present invention relates to a radio transceiver, and more particularly, to a radio transceiver having a plurality of switchable antennas.

2. Description of the Prior Art

Dipole antenna is commonly used in various radio transceivers such as mobile phones (GSM, DCS, DECT, etc.) for transmitting and receiving radio signals. Such dipole antenna can receive radio signals from all directions and thus is widely used in radio transceivers. The disadvantage of such dipole antenna is its low efficiency. In most circumstances, the radio signals are strong in certain directions and weak in others. But the dipole antenna can not enhance its efficiency according to this situation. In the meanwhile, a patch antenna is very direction-oriented. Only radio signals from the direction facing the patch antenna can be efficiently received. However, patch antennas are seldom used in radio transceivers, especially mobile phones. Because radio transceivers must be able to receive radio signals from all directions.

SUMMARY OF THE INVENTION

It is therefore a primary objective of the present invention to provide a radio transceiver which can selectively use the dipole antenna and patch antenna to increase signal communication efficiency.

In a preferred embodiment, the present invention provides a radio transceiver comprising:

a housing;

a dipole antenna installed on the housing for transmitting and receiving radio signals, said dipole antenna being connected to an antenna switch;

at least one patch antenna installed on the housing for transmitting and receiving radio signals, each patch antenna being connected to an antenna switch;

an impedance matching circuit connected to each said antenna switch;

a transceiver circuit connected to the impedance matching circuit for converting radio signals received by the antennas into base band signals and converting base band signals to be transmitted into radio signals; and mode control means for controlling each said antenna switch and the impedance matching circuit to match the impedance of the impedance matching circuit with the connected antennas.

It is an advantage of the present invention that the radio transceiver comprises both dipole antenna and patch antenna which are switchable for signal communications.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 1 is a perspective view of a radio transceiver according to the present invention.

FIG. 2 is a circuit schematic of the radio transceiver shown in FIG. 1.

FIG. 3 is a mode control table used by the radio transceiver shown in FIG. 1.

DETAILED DESCRIPTION OF THE PREFERRED EMBODIMENT

Please refer to FIG. 1. FIG. 1 is a perspective view of a radio transceiver 10 according to the present invention. The radio transceiver 10 comprises a housing 12 having a front side 11 facing an user when the device 10 is in use, a dipole antenna 14 installed on top of the housing 12 for transmitting and receiving radio signals, and three patch antennas 15, 16, 17 installed on right, rear and left sides of the housing 12 for transmitting and receiving radio signals in each respective direction.

Please refer to FIG. 2 and FIG. 3. FIG. 2 is a circuit diagram of the radio transceiver 10 shown in FIG. 1 and FIG. 3 is a mode control table 50 of the radio transceiver 10. The radio transceiver 10 comprises a dipole antenna 14 connected to an antenna switch S0, three patch antennas 15, 16, 17 connected to antenna switches S1, S2 and S3 separately, an impedance matching circuit 32 connected to each antenna switch, a transceiver circuit 40 electrically connected to the impedance matching circuit 32 for converting radio signals received by the antennas into base band signals for the processor 42 and converting the base band signals to be transmitted from the processor 42 into radio signals, a memory 44 for storing programs and data, a processor 42 for executing programs stored in the memory 44 to control operations of the radio transceiver 10, and a mode control circuit 34 for controlling each antenna switch and the impedance matching circuit 32 according to the ten control modes shown in FIG. 3 so that the impedance of the impedance matching circuit 32 can be matched with the impedance of the connected antennas 14, 15, 16 and 17.

The impedance matching circuit 32 comprises four resistors X0, X1, X2, X3 and four resistor switches S4, S5, S6, S7 connected to the four resistors X0, X1, X2, X3 respectively. The four resistors X0, X1, X2, X3 are connected in parallel and the resistance of the four resistors are designed to match the four antennas 14, 15, 16, 17. The resistor switches S4, S5, S6, S7 are controlled by the mode control circuit 34 so that the impedance of the impedance matching circuit 32 can match the impedance of the connected antennas 14, 15, 16 or 17. FIG. 3 shows ten different control modes. In each control mode, each antenna switch and the corresponding resistor switch will be opened or closed at the same time so that the impedance of the impedance matching circuit 32 can match the impedance of the connected antennas 14, 15, 16 or 17.

The memory 44 comprises an RSSI (received signal strength indicator) program 46 for detecting signal strength of the radio signals received by the transceiver circuit 40, and a mode control program 36 stored in the memory 44 for controlling the mode control circuit 34. The mode control program 36 and mode control circuit 34 can be treated as a mode control means which controls the four antenna switches S0–S3 and the impedance matching circuit 32 according to the signal strength detected by the RSSI program 46 to achieve the highest transmitting and receiving efficiency.

The antenna switches S0, S1, S2, S3 connected to the dipole antenna 14 and patch antennas 15, 16, 17 are switched on and off according to each control mode listed on the table shown in FIG. 3 by the mode control circuit 34 to achieve different antenna combinations. The control mode of the mode control circuit 34 is controlled by the mode control program 36. And the signal strength of each control mode can be detected by the RSSI program 46. When selecting a best control mode to achieve the highest communication efficiency, the mode control program 36 changes the control mode of the mode control circuit 34 one by one, records the signal strength of each control mode detected by the RSSI program 46, selects a best control mode according to a predetermined selection criterion, and changes the mode control circuit 34 to the selected best control mode to achieve the best communication quality.

The selection criterion of the best control mode can be set by manufacturers. For example, a control mode with the strongest signal strength can be selected as the best control mode, or a control mode consuming the least power among the control modes within which the signal strength is stronger than a predetermined minimum threshold. Normally, the best control mode is periodically selected by the mode control program 36 so that the signal communication quality can be maintained. In the meanwhile, if the signal strength detected by the RSSI program is weaker than a predetermined minimum signal strength threshold or the signal strength detected has declined in a slope greater than some predetermined value, the best control mode will be immediately selected again by the mode control program 36.

The mode control circuit 34 in FIG. 2 is used for controlling each antenna switch and the impedance matching circuit 32. When a proper control mode has been selected, the mode control program 36 will pass the mode number of the control mode in FIG. 3 to the mode control circuit 34. The mode control circuit 34 will immediately switch on or off the corresponding antenna and resistor switches according to the received mode number. In another embodiment, the antenna switches S0, S1, S2, S3 and resistor switches S4, S5, S6, S7 can be directly controlled by the processor 42, and thus the mode control circuit 34 can be eliminated. In this case the mode control table 50 shown in FIG. 3 can be stored in the memory 44 and the mode control program 36 can directly control the antenna and resistor switches according to the control modes of the mode control table 50.

Since it only takes a few milliseconds for the processor 42 to detect the signal strength of all the control modes contained in the mode control table 50 and select a best control mode, the radio transceiver 10 can always be maintained in a best control mode to achieve the best communication quality and efficiency.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A radio transceiver comprising:

a housing;

a plurality of antennas installed on different sides of the housing for transmitting and receiving radio signals toward/from different directions;

a plurality of antenna switches, each of said antennas being connected to one of said antenna switches respectively;

an impedance matching circuit connected to each of said antenna switches;

a transceiver circuit connected to the impedance matching circuit for converting radio signals received by the antennas into base band signals and converting base band signals into radio signals;

a received signal strength indicator (RSSI) for detecting signal strength of the radio signals received by a combination of at least two of the connected antennas; and mode control means for controlling each said antenna switch and the impedance matching circuit to match the impedance of the impedance matching circuit with the connected antennas according to signal strength detected by the RSSI.

2. The radio transceiver of claim 1, which further comprises a memory for storing programs and a processor for executing the programs to control operations of the radio transceiver.

3. The radio transceiver of claim 2 wherein the RSSI is an RSSI program stored in the memory for detecting signal strength of the radio signals received by the transceiver circuit.

4. The radio transceiver of claim 3 wherein the mode control means further comprises a mode control table stored in the memory which comprises a plurality of control modes defining various antenna switch combinations wherein the mode control means selects one of the control modes according to the signal strength to control each said antenna switch and the impedance matching circuit.

5. The radio transceiver of claim 4 wherein the mode control means comprises a mode control program stored in the memory for controlling each said antenna switch and the impedance matching circuit according to one of the control modes wherein the mode control program changes its control mode one by one, records the signal strength of each control mode generated by the RSSI program, selects a best control mode out of all the control modes according to a predetermined selection criterion, and changes its control mode to the best control mode.

6. The radio transceiver of claim 5 wherein the selection criterion selects the best control mode as the control mode with the strongest signal strength.

7. The radio transceiver of claim 5 wherein the selection criterion selects the best control mode as the control mode which consumes the least power among the control modes with the signal strength stronger than a predetermined minimum signal strength.

8. The radio transceiver of claim 5 wherein the best control mode will be selected again by the mode control program after a predetermined time period.

9. The radio transceiver of claim 5 wherein when the signal strength detected by the RSSI program is weaker than a predetermined minimum signal strength, the best control mode will be selected again by the mode control program.

10. The radio transceiver of claim 3 wherein the mode control means comprises a mode control circuit for controlling each said antenna switch and the impedance matching circuit according to a plurality of control modes defining various antenna switch combinations, and a mode control program stored in the memory for controlling the control mode of the mode control circuit wherein the mode control program changes the control mode of the mode control circuit one by one, records the signal strength generated by the RSSI program at each control mode, selects a best control mode out of all the control modes according to a predetermined selection criterion, and changes the control mode of the mode control circuit to the best control mode.

11. The radio transceiver of claim 10 wherein the selection criterion selects the best control mode as the control mode with the strongest signal strength.

12. The radio transceiver of claim 10 wherein the selection criterion selects the best control mode as the control mode which consumes the least power among the control modes with the signal strength stronger than a predetermined minimum signal strength.

13. The radio transceiver of claim 10 wherein the best control mode will be selected again by the mode control program after a predetermined time period.

14. The radio transceiver of claim 10 wherein when the signal strength detected by the RSSI program is weaker than a predetermined minimum signal strength, the best control mode will be selected again by the mode control program.

15. The radio transceiver of claim 1 wherein the impedance matching circuit comprises a plurality of resistors each connected with a switch wherein the switches are controlled by the mode control means for matching the impedance of the impedance matching circuit with the connected antennas.

* * * * *